United States Patent
Thibaud et al.

(10) Patent No.: US 11,713,985 B2
(45) Date of Patent: Aug. 1, 2023

(54) ENVIRONMENTAL CONDITION SENSING SYSTEM

(71) Applicant: Hamilton Sundstrand Corporation, Charlotte, NC (US)

(72) Inventors: Catherine Thibaud, South Windsor, CT (US); Zissis A. Dardas, Worcester, MA (US); Jagadeswara Reddy Karra, Ellington, CT (US); David L. Lincoln, Cromwell, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 224 days.

(21) Appl. No.: 17/070,008

(22) Filed: Oct. 14, 2020

(65) Prior Publication Data
US 2021/0116267 A1    Apr. 22, 2021

Related U.S. Application Data
(60) Provisional application No. 62/915,930, filed on Oct. 16, 2019.

(51) Int. Cl.
*G01D 5/353* (2006.01)
*B64D 11/06* (2006.01)
*G01L 1/24* (2006.01)
*G02B 6/06* (2006.01)

(52) U.S. Cl.
CPC ..... *G01D 5/35367* (2013.01); *B64D 11/0602* (2014.12); *B64D 11/0633* (2014.12); *G01L 1/243* (2013.01); *G02B 6/06* (2013.01)

(58) Field of Classification Search
None
See application file for complete search history.

(56) References Cited

U.S. PATENT DOCUMENTS

| | | | | |
|---|---|---|---|---|
| 2011/0051123 | A1* | 3/2011 | Kunigami | G01L 5/166 702/42 |
| 2018/0136053 | A1* | 5/2018 | Birnkrant | G01K 11/32 |
| 2022/0144437 | A1* | 5/2022 | Newbold | B64D 11/0647 |

FOREIGN PATENT DOCUMENTS

| | | | | |
|---|---|---|---|---|
| EP | 3321908 A1 | 5/2018 | | |
| GB | 2208711 A | * 4/1989 | ......... | G01D 5/35377 |
| JP | H03136195 A | 6/1991 | | |
| SU | 1179402 A1 | 9/1985 | | |

(Continued)

OTHER PUBLICATIONS

European Search Report for Application No. 20202404.8, dated Mar. 5, 2021, 7 pages.

(Continued)

*Primary Examiner* — Chad H Smith
(74) *Attorney, Agent, or Firm* — Cantor Colburn LLP

(57) ABSTRACT

Fibre optics for distributed environmental condition and/or air quality sensing such as, but not limited to, sensing air quality in enclosed areas of an aircraft such as the passenger cabin. Fibre optics can be used for sensing and for communication and are therefore well suited to the distributed sensing of environmental conditions such as temperature, relative humidity, gas and particulate composition within spaces of the aircraft e.g. the cabin, cargo space, cockpit, electronics bay etc. and in related systems such as the environmental control system (ECS), the cabin recirculation system, bleed air system etc.

9 Claims, 4 Drawing Sheets

(56) References Cited

FOREIGN PATENT DOCUMENTS

WO          2015183090 A1     12/2015
WO     WO-2015183090 A1 *     12/2015   ............. B01J 20/10

OTHER PUBLICATIONS

Batten, et al. "Terminology of metal-organic frameworks and coordination polymers (IUPAC Recommendations 2013)". Pure Appl. Chem., vol. 85, No. 8, pp. 1715-1724, 2013. (Jul. 29, 2013).
Hromadka, et al. "Optical fibre long period grating gas sensor modified with metalorganic framework thin films", Sensors and Actuators B 221 (2015) 891-899.

* cited by examiner

ENVIRONMENTAL CONDITION SENSING SYSTEM

CROSS-REFERENCE TO RELATED APPLICATIONS

This application claims priority to U.S. Provisional Application No. 62/915,930 filed on Oct. 16, 2019, the contents of which are incorporated herein by reference in its entirety.

TECHNICAL FIELD

The present disclosure relates to the field of environmental condition and air quality sensing and monitoring.

BACKGROUND

In many areas, there is a need to monitor the quality or properties of air or environmental conditions within closed spaces to ensure a clean and/or controlled environment, for reasons of e.g. health and safety or comfort of people. Air quality also needs to be monitored in e.g. clean rooms or sterile rooms such as in hospitals, laboratories or manufacturing facilities. The quality of air in vehicles including aircraft also needs to be controlled in the passenger cabin and cockpit for passenger and crew safety and comfort as well as often in other regions such as cargo areas and engine/electronics areas. It can also be desirable to monitor for the presence of objects in the closed space, for example people (e.g. aircraft passengers), cargo, flotation devices etc.

Air conditioning systems and environment control systems (ECS) are often controlled based on feedback from sensors in the closed space providing information on e.g. temperature, pressure, relative humidity etc. Filters are installed to remove contaminants and sensing systems are also known that detect gas, smoke etc.

Different types of sensor are required to detect different air properties such as temperature, pressure, relative humidity, trace gas/liquid vapour contaminant levels, particulate levels, biological species etc. and sensing systems need to be designed to incorporate a combination of types of sensor and sensor system and algorithms need to be configured to usefully analyse or use the data from the sensors. Some sensors can be bulky and/or expensive. Consideration needs to be given as to the optimum locations of the various sensors. Sensing a range of air properties can require a complex combination of sensors and because of the complexity there will be a limit on where sensors can be practically located. The accuracy of some sensors and their response time may also not be particularly good.

The inventors have, therefore, identified a need for a simple, lightweight, integral, distributed sensor system for monitoring air quality in a closed space. Ideally, such a system should allow data to be collected such that it can be effectively and reliably used to control related systems such as ECSs.

SUMMARY

The present disclosure provides a distributed environmental condition or air quality sensing system using optical fibres.

More specifically, there is provided a distributed environmental monitoring system comprising one or more optical fibres along the length of which light can be transmitted, the one or more optical fibres defining a plurality of nodes spaced along the length, each node configured to vary the properties of light returned back along the optical fibre(s) according to a condition of the environment detected at the node.

The nodes may be configured to detect a corresponding environmental condition at different locations within a closed space and/or to detect different environmental conditions.

Different environmental conditions can be detected by different nodes wherein the nodes are provided with a coating that reacts to a specific chemical. In addition, or alternatively, different nodes may provide indications of different pressure, temperature, relative humidity or other conditions of the environment at different locations due to different light scattering.

Different nodes may be provided with MOF coatings that respond to specific chemicals thus differentially changing the properties of the returned light.

The optical fibre can be provided with a combination of different types of node along its length to measure different conditions and/or with similar types of node at different locations to measure a corresponding condition at different locations.

DETAILED DESCRIPTION

This disclosure relates to the use of fibre optics for distributed environmental condition and/or air quality sensing such as, but not limited to, sensing air quality in enclosed areas of an aircraft such as the passenger cabin. Fibre optics can be used for sensing and for communication and are therefore well suited to the distributed sensing of environmental conditions such as temperature, relative humidity, gas and particulate composition within spaces of the aircraft e.g. the cabin, cargo space, cockpit, electronics bay etc. and in related systems such as the environmental control system (ECS), the cabin recirculation system, bleed air system etc.

The fibre optic network could be connected to a data acquisition system e.g. wirelessly from one or more communication nodes.

Figure 1:
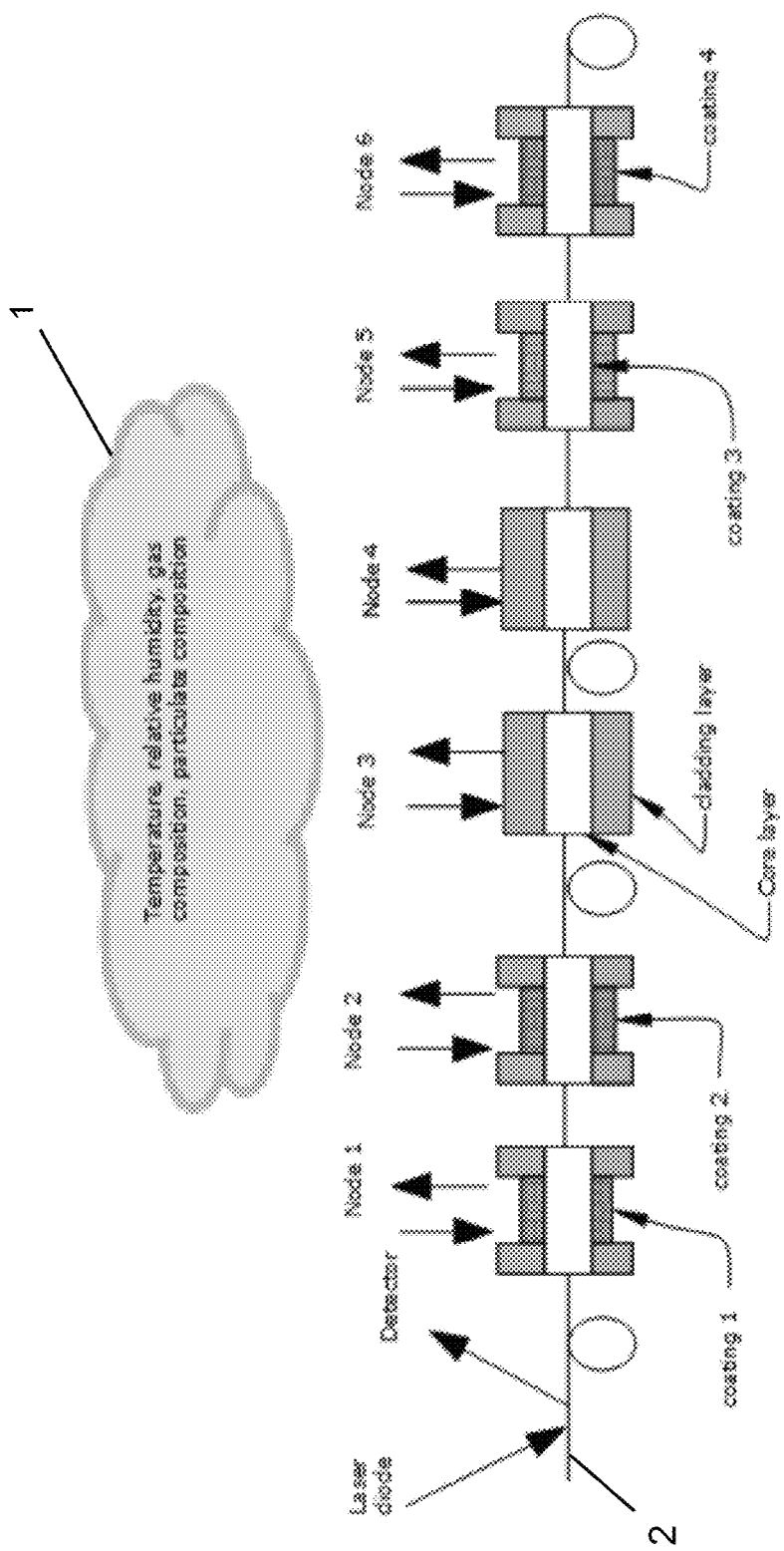
FIG. 1 is a simple schematic view of a sensing system according to the disclosure.

FIG. 1 is a simple schematic view of how the system of the disclosure could be implemented in a space in which air quality is to be monitored. In the example shown, the system is used to sense various properties of the air 1 such as temperature, relative humidity, gas composition and particulate composition. Of course, other properties such as strain and pressure could also be sensed.

The sensing system comprises one or more optical fibres 2 providing a plurality of nodes that can be appropriately positioned around the space in which the environment is to be monitored. The nodes are configured as further described above to have different sensing responses to different properties to be measured. For example, and as described in more detail below, one node may be configured to sense humidity, another to sense a particular gas e.g. CO. The responses of the different nodes will be transmitted back along the optical fibre to a detector to provide an integral detection of various properties of the environment.

Figure 2:
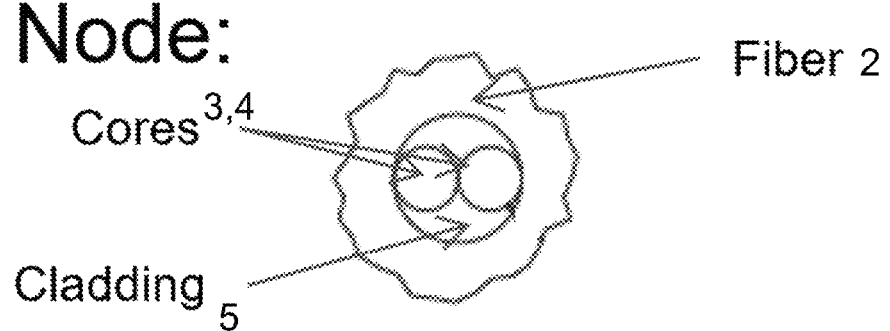
FIG. 2 is a cross-section of an optical fibre that could be used in a system according to the disclosure.
Figure 3:
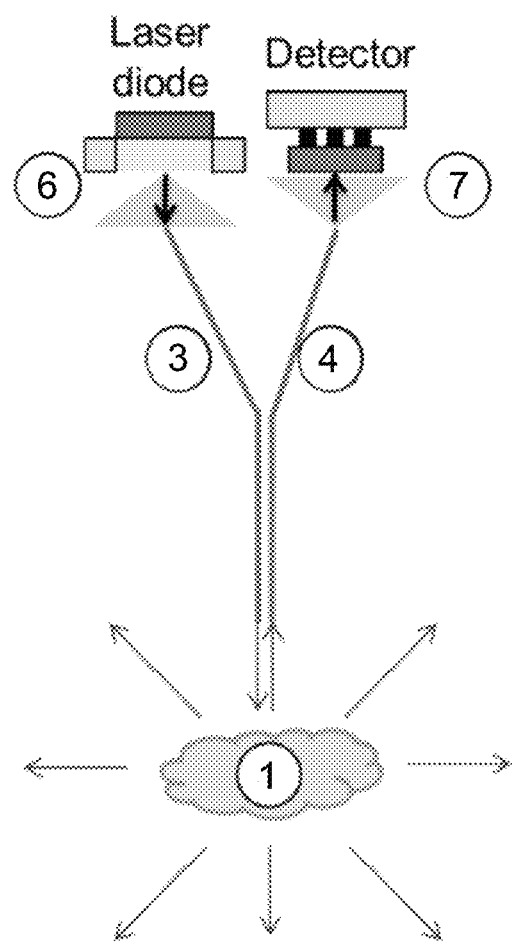
FIG. 3 is a schematic diagram showing how light is transmitted using an optical fibre.

FIG. 2 shows a cross sectional view of an optical fibre 2 for use in the present system at a node. The optical fibre comprises two cores 3, 4 provided within a tubular cladding 5. The way in which the optical fibre 1 is used is described with reference to the schematic view of FIG. 3. Light is emitted from a laser diode 6 and is transmitted along the fibre along one of the cores 3. The light exits the node into the environment 1 to be monitored. Depending on the properties of the air and the configuration of the node, as will be further described below, light having different properties than those of the transmitted light will be transmitted back along the fibre 2 along the second core 4. The reflected light exiting that core 4 will be picked up by a detector 7 which will determine, from the properties of the reflected light, a particular property of the air e.g. a particular level of particulate matter, a temperature, presence of a particular gas etc.

The cores 3,4 and cladding 5 can be made of various types of glass or plastic with high transmissivity and appropriate refractive indices to guide light within the core axially along the length of the fibre.

Light may be coherent radiation or incoherent radiation at any frequency or combination of frequencies in the electromagnetic spectrum.

Figure 4:
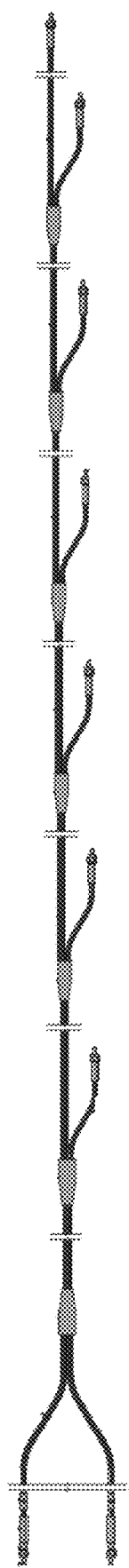
FIG. 4 shows a fibre harness defining a plurality of nodes along its length.

By providing different nodes within the space to be monitored, the same properties can be monitored at different locations within the space and/or different properties can be monitored due to nodes having different configurations. FIG. 4 shows how a fibre harness can be provided having several nodes along a length of fibre. The nodes may be provided from the main body of the fibre by e.g. connectors or splicing techniques.

Figure 5:
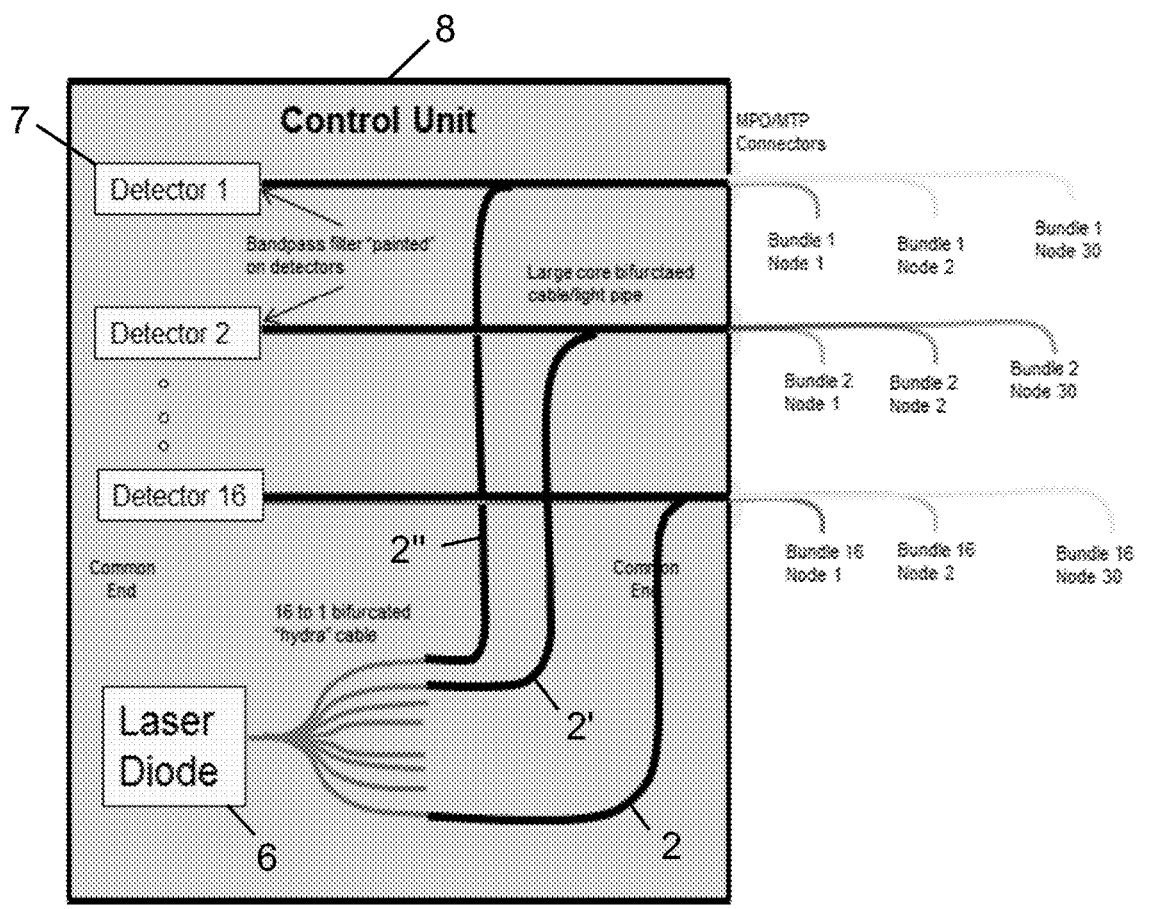
FIG. 5 is a schematic view of a sensing system according to the disclosure.

As shown in FIG. 5, a sensing system may be provided with a plurality of optical fibres 2, 2', 2" which may be fed by one or more light sources such as a laser diode 6. Each fibre provides a number of nodes and reflected light for each fibre is picked up by one or more detectors 7.

A control unit 8 is used to manage the operation of the system and may include control components, data acquisition, data processing and data analysis.

A sensing system may have a single optical fibre with several nodes or may comprise multiple fibres each having one or more nodes. The nodes can be spaced as desired along the fibre allowing them to be located where sensing is required in the space to be monitored e.g. at the location of particular machines or equipment in a lab or at locations corresponding to seats in an aircraft. Appropriate positioning on the nodes allows for quicker detection of air conditions as well as localisation.

Nodes configured to detect smoke or particulate matter may do this using scattered light. When light is emitted into the environment it is scattered by contact with e.g. smoke or dust particles. The detector will identify the angular dependence of the light scattering and can, from this, provide a basic level of specificity of the particulate matter that caused the scattering.

Similarly, multiple nodes can be used to detect gases e.g. $CO_2$, CO, $NO_2$, $NO_3$, $NH_3$, VOCs (alcohols, aldehydes, ketones, etc.) at different locations. Reflected signals from each node can be distinguished by the flight time due to variations in the length of each fibre in a fibre bundle.

Optical sensing at the nodes may be based on Fibre Bragg Gratings (FBGs). Here, a FBG is incorporated in the optical fibre. A specific coating e.g. a selected polymer that deforms in the presence of a specific gas or chemical compound, is provided over the FBG. When the coating is exposed to the specific compound, it will deform, causing the FBG to stretch or shrink. This causes the spectral pattern of the reflected light to change and a shift in reflected wavelength is observed at the detector. This change in reflected wavelength will provide quantitative information on the environmental effect. Different coatings, responsive to different compounds, may be provided at different gratings in the optical fibre.

Nodes may also be configured to monitor temperature and/or pressure using fibre gratings and/or light scattering. For example, nodes could be provided at or embedded in seats of an aircraft to detect pressure at the seat indicative of the presence of a passenger. Similarly, nodes can detect the presence of other objects such as seat flotation devices.

Detection of different contaminants in the environment is also provided by nodes configured as shown in FIG. 1 provided with a metal organic framework (MOF) coating. MOFs can be coated on Fibre Bragg Gratings or fibre long period gratings incorporated in the optical fibre. MOFs are crystalline materials with tunable porosity, large internal surface area, large pore volumes, and organic functionality. As the porosity can be varied, MOFs can be designed to offer specific affinity/interactions to specific chemicals/analytes. Thus, different nodes can be coated with different MOF structures to detect different chemicals in the environment. MOFs for chemical sensing using optical fibres are discussed in 'Sensors and Actuators B: Chemical; Optical fibre long period grating gas sensor modified with metal organic framework thin films; Jiri Hromadka, Begum Tokay, Stephen James, Ralph P. Tatam, Sergia Korposh; Elsevier (2015) available at http://dx.doi.org/10.1016/j.snb.2015.07.027'.

Metal organic framework materials are well-known in the art, and comprise metal ions or clusters of metal ions coordinated to organic ligands to form one-, two- or three-dimensional structures. A metal-organic framework can be characterized as a coordination network with organic ligands containing voids. The coordination network can be characterized as a coordination compound extending, through repeating coordination entities, in one dimension, but with cross-links between two or more individual chains, loops, or spiro-links, or a coordination compound extending through repeating coordination entities in two or three dimensions. Coordination compounds can include coordination polymers with repeating coordination entities extending in one, two, or three dimensions. Examples of organic ligands include but are not limited to bidentate carboxylates (e.g., oxalic acid, succinic acid, phthalic acid isomers, etc.), tridentate carboxylates (e.g., citric acid, trimesic acid), azoles (e.g., 1,2,3-triazole), as well as other known organic ligands. Metal organic frameworks are further described by Batten, S R; Champness, N R; Chen, X-M; Garcia-Martinez, J; Kitagawa, S; Öhrström, L; O'Keeffe, M; Suh, M P; Reedijk, J (2013). "Terminology of metal-organic frameworks and coordination polymers (IUPAC Recommendations 2013)", Pure and Applied Chemistry. 85 (8): 1715. doi:10.1351/PAC-REC-12-11-2.

A wide variety of metals can be included in a metal organic framework. In some embodiments, the metal organic framework comprises a transition metal, including but not limited to any of the transition metals described above with respect to transition metal oxide adsorbents. Examples of metals that can be included in the metal organic framework include Cu, Mg, Cr, Al, Mn, Co, Zr, Zn. Lanthanide metals can include Ln, Eu, Ce, Er. Examples of specific metal organic framework materials include UIO-66 Zr-bdc, UiO-66-NH$_2$ ({Zr(bdc-NH$_2$)2} with (bdc-NH$_2$)=2-amino-1,4-benzenedicarboxylate)), UIO-67 (Zr-bpdc) with bpdc=biphenyl-4,4'-dicarboxylic acid), MIL-101 ([Cr$_3$(O)X (bdc)$_3$(H$_2$O)$_2$] (X=OH or F) with bdc=1,4-benzene dicarboxylate), NU-1000 ({Zr$_6$(µ3-OH)$_8$(—OH)$_8$(TBAPy)$_2$ with TABAPy=1,3,6,8,-tetrakis(p-benzoic-acid)pyrene)), PCN-777 ({[Zr$_6$O)$_4$(OH)$_{10}$(H$_2$O)$_6$(TATB)$_2$ with TATB=4,4',4"-s-triazine-2,4,6-triyl-tribenzoate),MOF-808 Zr$_6$O$_4$(OH)$_4$ (BTC)$_2$(HCOO)$_6$ with BTC=1,3,5-benzenetricarboxylate), MOF-200 and MOF-210 [Zn$_4$O(BBC)$_2$ and (Zn$_4$O)$_3$(BTE)$_4$(BPDC)$_3$, respectively; BBC=4,4',4"-(benzene-1,3,5-triyl-tris(benzene-4,1-diyl))tribenzoate; BTE=4,4',4"-(benzene-1,3,5-triyl-tris(ethyne-2,1-diyl)) tribenzoate; BPDC=biphenyl-4,4'-dicarboxylate], MOF-177 [Zn$_4$O (BTB)$_2$; BTB=4,4',4"-benzene1,3,5-triyl-tribenzoate], [MOF-399, Cu$_3$(BBC)$_2$] with BBC3—=4,4',4"-(benzene-1, 3,5-triyl-tris(benzene-4,1-diyl))tribenzoate. MOF's can be synthesized by hydrothermal or solvothermal techniques, where crystals are slowly grown from a hot solution. Templating for the MOF structure can be provided by a secondary building unit (SBU) and the organic ligands. Alternate synthesis techniques are also available, such as chemical vapor deposition, in which metal oxide precursor layers are deposited followed by exposure of the precursor layers to sublimed ligand molecules to impart a phase transformation to the MOF crystal lattice.

In some embodiments, the MOF can be configured to promote absorption or adsorption of target contaminant(s). For example, tricresyl phosphate is commonly used as an anti-wear or anti-corrosion additive in hydraulic fluids used on aircraft. Tricresyl phosphate is toxic and has a low vapor pressure, which can make it a problematic contaminant for aircraft pressurized air, even at low concentrations. In some embodiments, the MOF can be configured to deter absorption or adsorption of potential cross-contaminants (i.e., compounds that could produce a false positive) by the MOF. For example, the MOF can include functional groups appended to metal or organic portions of the framework that can attract or otherwise interact the contaminant(s). The MOF can also be configured with a porosity adapted for adsorption of the contaminant(s). In the case of testing for TCP, the pore size of the MOF should be larger than at least 1.5 nm, as the TCP molecule kinetic diameter is larger than 1.5 nm. In some embodiments, the MOF can include pore sizes from 1.5 nm to 4 nm. Polar groups can be included in the MOF to attract or otherwise interact with polar contaminants such as tricresyl phosphate. Examples of polar substituent groups that can be included in the MOF can include hydroxyl, carbonyl, carboxyl, amino. In some embodiments, the MOF can be immobilized in a polymer matrix in order to increase the sensitivity of the target analyte. In some embodiments, metal oxides (e.g., zinc oxide, iron oxide, titania, vanadium oxide) can be incorporated within the pore system of MOF for enhanced selectivity of the target analyte. In some cases, metal nanoparticles (e.g., gold, platinum, palladium, copper, and nickel) can be impregnated in the pore system of MOF to enhance the selectivity of the target analyte.

In an embodiment (not shown in detail but seen in FIG. 1), the node with the metal organic framework may be disposed inside of a flow cell equipped with an inlet and an outlet. The inlet receives air from the environment. The core 3 is optically connected on one end to the light source 6 (e.g., a laser at a wavelength, e.g., a near-infrared (NIR) laser, that is absorbed by the contaminant but not by other likely components of the gas sample). The light source 6 is connected to the core 3 through an optical connection (not shown). The optional connection can be any type of optical connection such as a fiber optic cable extension of the fiber optic element in the flow cell, or a direct connection of the light source 6 to the fiber optic element in the flow cell. The core 3 is optically connected on another end to a light detector 7 e.g. through an optical connection (not shown), which can be the same or different type of optical connection as the optical connection. The control unit 8 may be connected to read the output of the light detector 7, and can be operationally connected (e.g., through wired connections (not shown) or through wireless connections) to other system components such as the light source 6, or to other on-board systems and operational structures.

During operation, air is introduced to the flow cell through the inlet. In the presence of a contaminant such as tricresyl phosphate, the contaminant is adsorbed by the MOF to concentrate the contaminant molecules at the interface with the fiber optic cores 3,4 where the contaminant molecules provoke a change of the evanescent field of travelling light returned in the fiber optic core 4, which in turn impacts signal intensity as well as spectral changes in the light received by light detector 7. In some embodiments, the control unit 8 can generate a response (or can engage with a master system controller to generate a response), including but not limited to providing a system alarm to the presence of the contaminant, reducing a flow rate of compressed outside air to an air cycle machine, in the case of an ECS, or increasing a recirculation flow rate in an aircraft pressurized zone.

The use of fibre optics easily allows distributed sensing to provide adequate measurement granularity to adjust environmental conditions for example in aircraft at seat level for personalised comfort and can provide multiple sensing points for monitoring in a cost effective manner e.g. for detecting unusual or abnormal events. The use of fibre optics has the benefits of smaller size and weight, EMI immunity, longer transmission distances and higher bandwidth.

The described embodiments are by way of example only. The scope of this disclosure is limited only by the claims.

The invention claimed is:
1. A distributed environmental monitoring system comprising:
one or more optical fibres along a length of which light can be transmitted,
wherein each optical fibre comprises a tubular cladding along the interior of which runs a first core along which light is transmitted from a first end of the fibre to a second end of the fibre, the light exiting the second end into an environment to be sensed, and a second core along which light returned from the environment is transmitted from the second end to the first end;
wherein the one or more optical fibres define a plurality of nodes spaced along the length, each node configured to vary the properties of light returned back along the optical fibre(s) according to a condition of the environment detected at the node,
each node varying the properties of the returned light differently based on its configuration and its location along the length of the optical fibre; the system further comprising a light source for transmitting light into and along the optical fibre(s) and one or more detectors for receiving light returned along the optical fibre(s) from the environment via the nodes;
wherein one or more of the one or more nodes is located at or in a passenger seat of an aircraft;

wherein at least one of one or more nodes located at or in a passenger seat is provided in the seat and detects pressure due to presence of a passenger in the seat as the condition of the environment.

2. The system of claim 1, wherein one or more of the one or more nodes is configured to detect a condition of the environment due to light scattering at the node.

3. The system of claim 1, wherein one or more of the one or more nodes is configured to detect a condition of the environment due to deformation of fibres by deformation of a coating provided at the node in response to the coating being contacted by a specific substance.

4. The system of claim 1, wherein the system is configured to detect a condition of the environment due to a metal organic framework (MOF) coating at the node being contacted by a specific substance.

5. A distributed environmental monitoring system comprising:
 one or more optical fibres along a length of which light can be transmitted,
 wherein each optical fibre comprises a tubular cladding along the interior of which runs a first core along which light is transmitted from a first end of the fibre to a second end of the fibre, the light exiting the second end into an environment to be sensed, and a second core along which light returned from the environment is transmitted from the second end to the first end;
 wherein the one or more optical fibres define a plurality of nodes spaced along the length, each node configured to vary the properties of light returned back along the optical fibre(s) according to a condition of the environment detected at the node,
 each node varying the properties of the returned light differently based on its configuration and its location along the length of the optical fibre;
 the system further comprising a light source for transmitting light into and along the optical fibre(s) and one or more detectors for receiving light returned along the optical fibre(s) from the environment via the nodes;
 wherein one or more of the one or more nodes is located at or in a passenger seat of an aircraft;
 wherein at least one of one or more nodes located at or in a passenger seat detects pressure due to presence of an object in proximity to the seat as the condition of the environment.

6. The system of claim 5, wherein the object is a flotation device.

7. The system of claim 5, wherein one or more of the one or more nodes is configured to detect a condition of the environment due to light scattering at the node.

8. The system of claim 5, wherein one or more of the one or more nodes is configured to detect a condition of the environment due to deformation of fibres by deformation of a coating provided at the node in response to the coating being contacted by a specific substance.

9. The system of claim 5, wherein the system is configured to detect a condition of the environment due to a metal organic framework (MOF) coating at the node being contacted by a specific substance.

\* \* \* \* \*